(12) United States Patent  
Hwang et al.

(10) Patent No.: US 9,203,968 B1  
(45) Date of Patent: *Dec. 1, 2015

(54) PROVIDING CONFERENCE INFORMATION IN A DISTRIBUTED CONFERENCING SYSTEM

(71) Applicant: ShoreTel, Inc., Sunnyvale, CA (US)

(72) Inventors: Vu T. Hwang, San Jose, CA (US); Nam Do, Pleasanton, CA (US); Eric Carino, Santa Clara, CA (US); Pascal Crausaz, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,125

(22) Filed: Jun. 9, 2014

Related U.S. Application Data

(63) Continuation of application No. 13/437,779, filed on Apr. 2, 2012, now Pat. No. 8,786,669.

(51) Int. Cl.  
*H04N 7/14* (2006.01)  
*H04M 3/56* (2006.01)

(52) U.S. Cl.  
CPC ..................... *H04M 3/562* (2013.01)

(58) Field of Classification Search  
CPC ....................................................... H04N 7/14  
USPC ........... 348/14.01, 14.08, 14.09, 14.12, 14.11  
See application file for complete search history.

(56) References Cited

U.S. PATENT DOCUMENTS

| 6,671,262 | B1 | 12/2003 | Kung et al. |
| 8,786,669 | B1 * | 7/2014 | Hwang et al. ............... 348/14.09 |
| 2005/0108328 | A1 * | 5/2005 | Berkeland et al. ............ 709/204 |
| 2010/0165889 | A1 | 7/2010 | Madabhushi et al. |
| 2012/0260122 | A1 * | 10/2012 | Puri et al. .......................... 714/3 |
| 2012/0287228 | A1 * | 11/2012 | Mishra et al. ............... 348/14.09 |

OTHER PUBLICATIONS

Notice of Allowance of Mar. 18, 2014 for U.S. Appl. No. 13/437,779, 6 pages.

* cited by examiner

*Primary Examiner* — Olisa Anwah  
(74) *Attorney, Agent, or Firm* — Kilpatrick Townsend & Stockton LLP (57) ABSTRACT

A method for providing conference information to attendees of a conference call near real time using a plurality of conference bridges includes receiving the conference information at a first conference bridge. The conference information is generated in response to input from a participant in the conference call using a first device. The method also includes providing the conference information from the first conference bridge to a first group of attendees. The method also includes providing the conference information from the first conference bridge to a second conference bridge separate from the first conference bridge, and providing the conference information from the second conference bridge to a second group of attendees.

19 Claims, 7 Drawing Sheets

FIG. 6

PROVIDING CONFERENCE INFORMATION IN A DISTRIBUTED CONFERENCING SYSTEM

CROSS-REFERENCE TO RELATED APPLICATIONS

The present application is a continuation of U.S. patent application Ser. No. 13/437,779, filed Apr. 2, 2012, the disclosure of which is incorporated herein by reference in its entirety for all purposes.

FIELD OF THE INVENTION

The present invention relates generally to conferencing systems and, more particularly, to methods and apparatuses for providing conference information in a distributed conferencing system.

BACKGROUND

Conference calls allow multiple participants to join in a conference and may involve the sharing of data such as audio, video, web, and/or other data. A conference call that includes voice data is often referred to as a teleconference. Conferencing has become especially important for businesses as it enables them to reduce travel costs by allowing workers from different locations to participate in conference calls in lieu of face-to-face meetings. A typical business conference call may include a telephone call that is coordinated with the sharing of a presentation or document via the Internet or another computer network. The audio portion of the call may be carried over a conventional public switched telephone network (PSTN) and/or shared through the use of a voice over Internet protocol (VoIP) service. Other resources such as video and web are typically provided via a computer network such as the Internet. In most systems, management of these resources is performed by a conference bridge.

A conference bridge is a machine that links conference participants and enables the sharing of resources between them. A conference bridge may also provide conferencing services such as recording and reporting functions. A conference bridge typically includes a number of ports each configured to provide one or more resources (e.g., audio, video, web and/or the like) to a conference participant. The number of participants that can join a conference call is typically limited by the number and configuration of the ports on the conference bridge hosting the conference combined with hardware and software limitations (e.g., CPU resources, available memory, and the like).

Due to the increasing importance of conferencing, methods are continuously desired to improve conferencing services.

SUMMARY

Embodiments of the present invention provide improved conferencing services using distributed conferencing systems. A distributed conferencing system includes more than one conference bridge. The conference bridges may be located at the same or at different sites within the system. A site includes a physical or logical grouping of communication devices. A physical grouping may be used, for example, by a company that has offices in different cities, and parts of its communication infrastructure (e.g., communication devices such as IP phones, switches, data storage devices, conference bridges, and the like) are located in different cities. A logical grouping may be used, for example, by a company that has a large office in a particular city, and parts of its communication infrastructure for that office are separated into groups (such as by business group). In either case, the groupings are typically used to allocate resources and improve performance.

Some embodiments of the present invention utilize conference bridges at different sites to provide conference information to communication devices at the different sites. Alternatively, the conference bridges may be used to provide the conference information to the communication devices at a single site. The conference information may be sent between the conference bridges and from each conference bridge to attendees of the conference call. Examples of conference information include conference data such as audio, video, web, and the like. Audio data may include voice data, and video and web data may include documents and presentations. Examples of conference information also include conference events such as chat messages, sending images, and the like. Generally the conference data is provided by an attendee acting in a presenter role (which may be passed to different attendees throughout a conference call), whereas the conference events are provided by attendees at any time during the conference call.

In one embodiment of the present invention, a method for providing conference information to attendees of a conference call near real time using a plurality of conference bridges includes receiving the conference information at a first conference bridge. The conference information is generated in response to input from a participant in the conference call using a first device. The first device may be communicatively coupled to the first conference bridge via a port on the first conference bridge. The method also includes providing the conference information from the first conference bridge to a first group of attendees each participating in the conference call using devices that are communicatively coupled to the first conference bridge via ports on the first conference bridge. The method also includes providing the conference information from the first conference bridge to a second conference bridge separate from the first conference bridge, and providing the conference information from the second conference bridge to a second group of attendees each participating in the conference call using devices that are communicatively coupled to the second conference bridge via ports on the second conference bridge.

In an embodiment, the first conference bridge may be part of a first site that comprises a physical or logical grouping of a first group of communication devices and the second conference bridge may be part of a second site that comprises a physical or logical grouping of a different group of communication devices.

In another embodiment, the conference information provided from the first conference bridge to the first group of attendees may comprise audio data and video or web data, and the conference information provided from the second conference bridge to the second group of attendees may consist of video or web data only.

In another embodiment, the conference information provided from the first conference bridge to the first group of attendees may be recorded at the first conference bridge, and the conference information provided from the second conference bridge to the second group of attendees may not be recorded at the second conference bridge.

In another embodiment, the method also includes providing the conference information from the second conference bridge to a third conference bridge separate from the first and second conference bridges. The method also includes providing the conference information from the third conference bridge to a third group of attendees each participating in the conference call using devices that are communicatively coupled to the third conference bridge via ports on the third conference bridge.

In another embodiment, the conference information is provided from the first conference bridge to the second conference bridge using a peer-to-peer network architecture.

In another embodiment, the conference information may be provided from the first conference bridge to the first group of attendees before the conference information is provided from the second conference bridge to the second group of attendees, and a current key frame of the video or web data may be provide from the first conference bridge to the second conference bridge before a previous key frame or previous partial image frames of the video or web data is provide from the first conference bridge to the second conference bridge.

In another embodiment, all of the ports on the first conference bridge may be utilized to provide the conference information to the devices used by first group of attendees, and a portion of the ports on the second conference bridge are utilized to provide the conference information to the devices used by the second group of attendees.

In another embodiment, a portion of the ports on the first conference bridge may be utilized to provide the conference information to the devices used by first group of attendees, and a portion of the ports on the second conference bridge may be utilized to provide the conference information to the devices used by the second group of attendees.

In another embodiment, the method also includes receiving an event at the second conference bridge, the event generated in response to input from an attendee of the second group of attendees, and providing the event from the second conference bridge to other attendees of the second group of attendees. Concurrently with providing the conference information from the first conference bridge to the second conference bridge, the method also includes providing the event from the second conference bridge to the first conference bridge and providing the event from the first conference bridge to the first group of attendees.

In another embodiment of the present invention, a method for providing conference information to conference participants near real time using a distributed conferencing system includes, during a first period of time, providing the conference information from a first conference bridge to a first group of participants each participating in a conference call using devices that are communicatively coupled to the first conference bridge via ports on the first conference bridge. The conference information may include at least one of audio, video, or web data, and the first group of participants may consist of a plurality of participants at a first site and a participant at a second site. The first site may include the first conference bridge and the second site may include a second conference bridge. The method also includes, during a second period of time, providing the conference information from the first conference bridge to a first portion of a second group of participants each participating in the conference call using devices that are communicatively coupled to the first conference bridge via ports on the first conference bridge. The first portion of the second group of participants may include the plurality of participants at the first site. The method also includes, during the second time period, providing the conference information from the first conference bridge to the second conference bridge, and providing the conference information from the second conference bridge to a second portion of the second group of participants each participating in the conference call using devices that are communicatively coupled to the second conference bridge via ports on the second conference bridge. The second portion of the second group of participants may include the participant at the second site and one or more other participants at the second site that were not participating in the conference call during the first period of time.

In yet another embodiment of the present invention, a conference bridge configured to provide conference information to attendees of a conference call near real time in a distributed conferencing system includes a receiving module configured to receive the conference information, where the conference information includes at least one of video or web data. The conference bridge also includes a first providing module configured to provide the conference information to a first group of attendees each participating in the conference call using devices that are communicatively coupled to the first conference bridge via ports on the first conference bridge. The conference bridge also includes a second providing module configured to provide the conference information from the first conference bridge to a second conference bridge separate from the first conference bridge.

Numerous benefits are achieved using embodiments of the present invention over conventional techniques. For example, some embodiments utilize conference bridges to provide conference information to communication devices that are located at different sites. This can reduce overall bandwidth requirements by sending conference information between conference bridges at the different sites rather than between a conference bridge and each communication device at a different site. Other embodiments utilize multiple conference bridges only when there are multiple attendees at more than one site. While utilizing multiple conference bridges can reduce overall bandwidth requirements, this can also increase latency. Multiple conference bridges can be used when the bandwidth benefit outweighs the latency downside. In other embodiments, multiple conference bridges are utilized to increase capacity. Each conference bridge has a limited number of communication ports, and if more ports are needed for attendees of a conference call than a conference bridge has available, then communication ports from other conference bridges in the system can be utilized. The other conference bridges may be at the same or at different sites. In yet other embodiments, multiple conference bridges are utilized to improve fault tolerance. If one conference bridge fails during a conference call that is supported by multiple conference bridges, the other conference bridges can support the conference call. Attendees that were being supported by the failed conference bridge can re-join the conference call through one of the other conference bridges. In other embodiments, when an additional conference bridge begins supporting a conference call that is already in progress, a current key frame of the conference information is provided to the additional conference bridge before a previous key frame of the conference information is provided. This can bring the conference bridge on-line more quickly than waiting for all of the previous conference information to be provided, which allows the conference information to be provided to the attendees more quickly. In yet other embodiments, some of the conference bridges supporting a conference call may provide audio with video and/or web data, while other conference bridges supporting the conference call may provide video and/or web data only. This can improve security and performance. Security can be improved by allowing conferencing services such as recording to be performed only on those conference bridges that are located in a secure computing environment. Performance can be improved by arranging the conference bridges so that only video or web data passes through a firewall and audio data stays within the firewall. Depending

DETAILED DESCRIPTION

Embodiments of the present invention provide improved conferencing services using distributed conferencing systems. Some embodiments utilize conference bridges to provide conference information to communication devices at different sites. Other embodiments utilize multiple conference bridges only when there are multiple attendees at more than one site. In other embodiments, when an additional conference bridge begins supporting a conference call that is already in progress, a current key frame of the conference information is provided to the additional conference bridge before a previous key frame of the conference information is provided. In yet other embodiments, some of the conference bridges supporting a conference call may provide audio with video and/or web data, while other conference bridges supporting the conference call may provide video and/or web data only. These and other embodiments are described more fully below.

Figure 1:
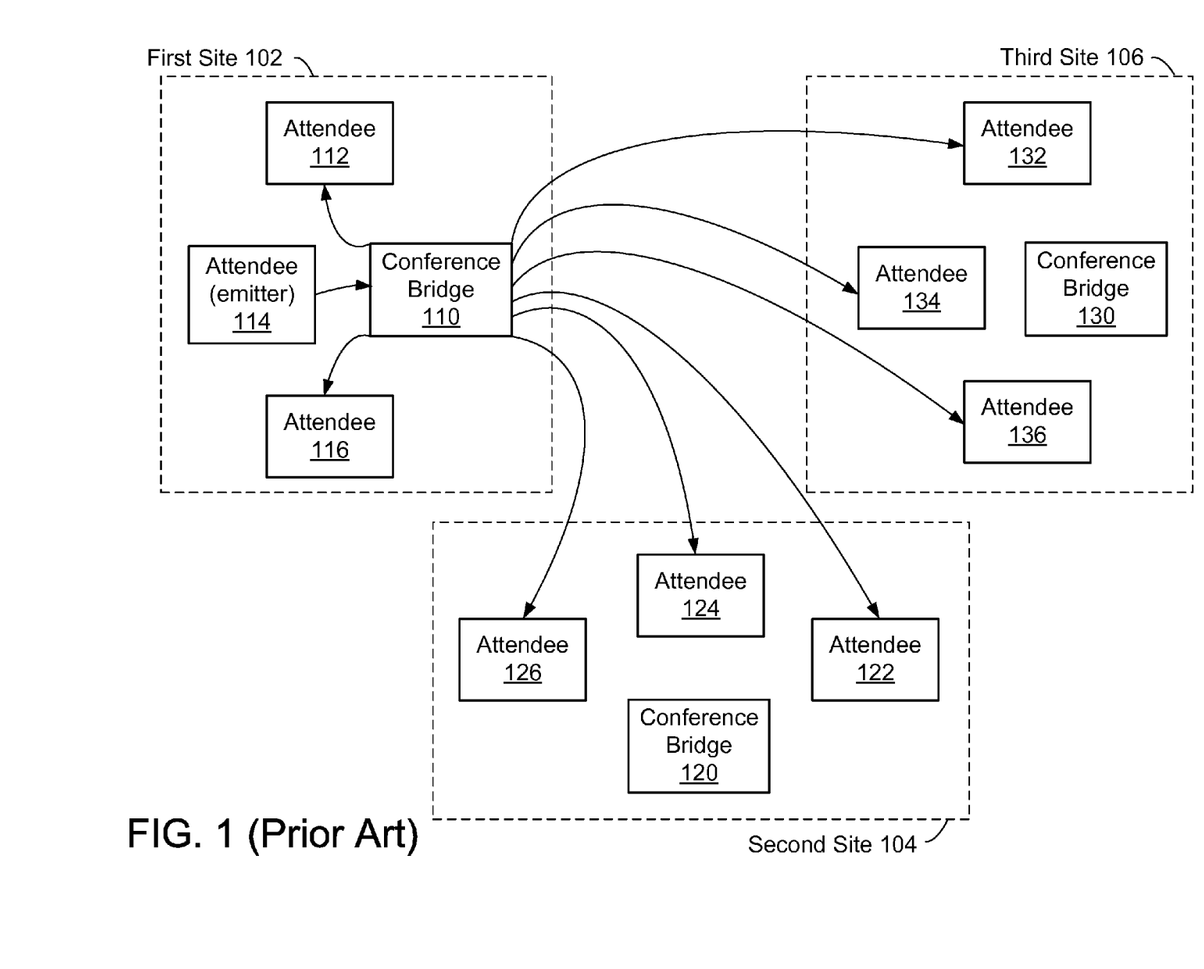
FIG. 1 is a simplified diagram of a conventional conferencing system where a conference bridge provides conference information to attendees at different sites.

FIG. 1 is a simplified diagram of a conventional conferencing system where a conference bridge provides conference information to attendees at different sites. A first site 102 includes a conference bridge 110 and attendees 112, 114, 116. A second site 104 includes a conference bridge 120 and attendees 122, 124, 126. A third site 106 includes a conference bridge 130 and attendees 132, 134, 136. As illustrated in this figure, attendee (or emitter) 114 provides conference information to the conference bridge 110, and the conference bridge 110 provides the conference information to attendees 112, 116 at the first site 102; attendees 122, 124, 126 at the second site 104; and attendees 132, 134, 136 at the third site 106. The conference information may be passed between each of the devices using a network such as the Internet or using any other computer and/or communication network using known techniques.

Figure 2:
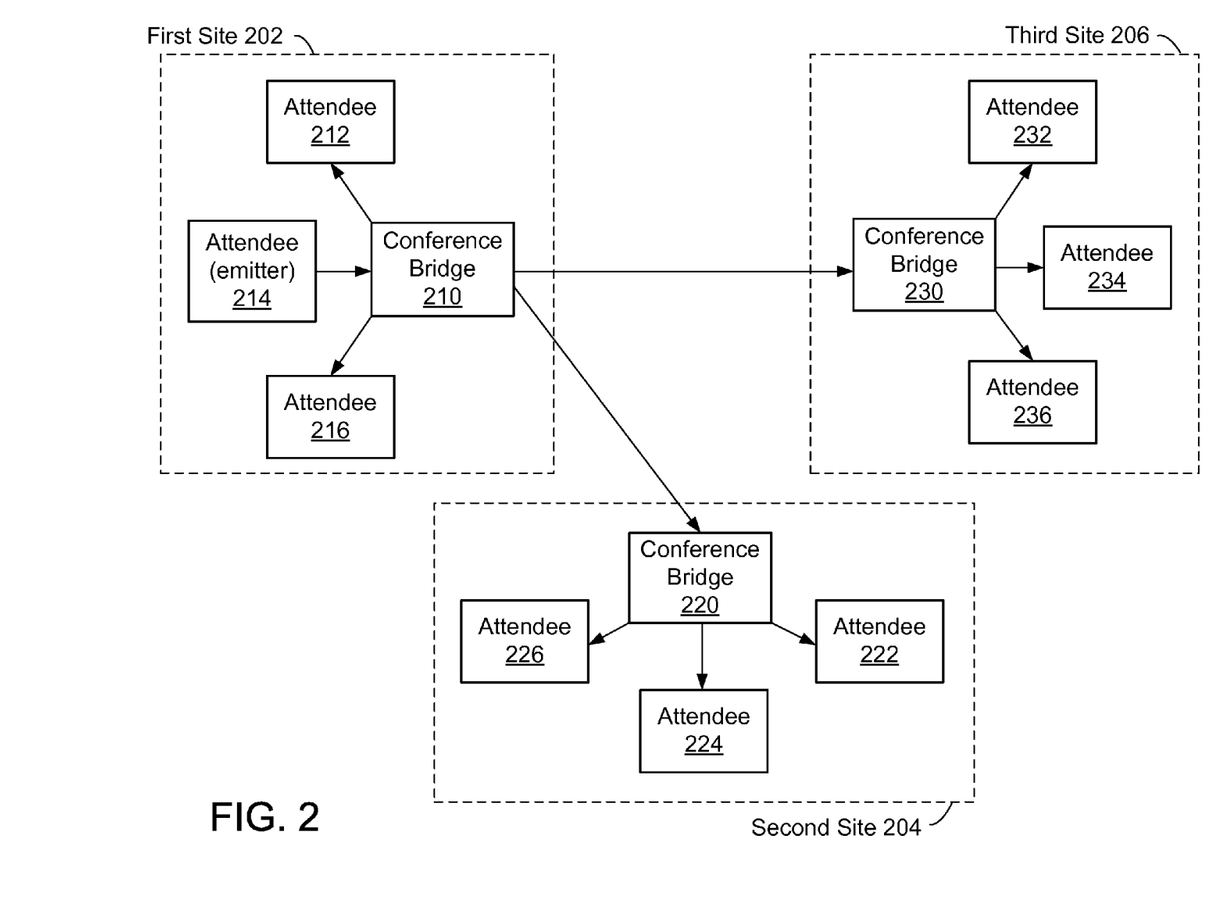
FIG. 2 is a simplified diagram of a distributed conferencing system where conference bridges provide conference information to attendees at different sites in accordance with an embodiment of the invention.

FIG. 2 is a simplified diagram of a distributed conferencing system where different conference bridges provide conference information to attendees at different sites in accordance with an embodiment of the invention. It should be appreciated that the simplified diagrams used in this application are intended to provide an exemplary high-level configuration that includes the components necessary to describe and enable embodiments of the invention. For example, in an embodiment each attendee may participate in a conference call using a communication device (not shown) such as an IP phone, and each IP phone may be communicatively coupled to a voice over Internet protocol (VoIP) switch (not shown) that is communicatively coupled to a conference bridge (or a port on the conference bridge). It should also be appreciated that, in light of the present disclosure, embodiments of the invention may be used with systems having different configurations and/or different components. Further, the components illustrated may represent physical and/or functional components or groupings of components in actual systems.

The system shown in FIG. 2 includes a conference bridge 210 and attendees 212, 214, 216 at a first site 202. As used herein, a site may represent a grouping of devices or resources that is physically distinct from other groupings of devices. Alternatively, a site may represent a topology-related grouping of devices that are not in physically distinct locations. Also, while the system illustrated in FIG. 2 shows three sites that each include a conference bridge supporting three attendees, embodiments of the present invention are not so limited. For example, the present invention may apply to systems with more or fewer sites as well as to sites with different devices and configurations compared to other sites in the system. One of ordinary skill in the art would recognize many variations, modifications, and alternatives in light of the present disclosure.

The conference bridge 210 is typically a server that is configured to provide conferencing resources and applications. The conferencing resources may include audio, video, and/or web resources, and the applications may include calendaring and other conferencing functions. The conference bridge 210 may include typical computing components such as one or more processors, a network adapter, data ports, non-transitory memory, input and output devices, a system bus, a power supply, and the like. The conference bridge 210 may also include typical software components such as an operating system and the software-based conferencing applications. In most conferencing systems, a web portal is used to access the conference bridge 210. The web portal provides an interface to the conferencing applications on the conference bridge 210. The web portal is typically a software component accessed via a browser running on a PC.

The attendees 212, 214, 216 may participate in a conference call using a device such as an IP phone, a soft phone, an analog or digital phone, a cellphone or smartphone, a button box, a virtual phone (e.g., extension that is not assigned to a specific device), an IP trunk (e.g., endpoint that can make inbound and outbound calls to the PSTN and to other telephony systems), or the like.

The system shown in FIG. 2 also includes a conference bridge 220 and attendees 222, 224, 226 at a second site 204 and a conference bridge 230 and attendees 232, 234, 236 at a third site 204. Each of these may be configured in a manner similar to that described above with regard to the conference bridge 210 and attendees 212, 214, 216 at the first site 202.

FIG. 2 provides a snapshot of conference information passing between the conference bridges 210, 220, 230 and attendees 212, 214, 216, 222, 224, 226, 232, 234, 236 during a conference call. As indicated by an arrow in FIG. 2, the attendee (or emitter) 214 provides conference information to the conference bridge 210. The attendee 214 may be functioning, for example, as a presenter and sharing conference information such as a PC desktop and document or presentation. Typically only one attendee at a time acts as a presenter during a conference call. The role of presenter may pass from one attendee to another based on a permission, request, grant, or similar scheme. Thus, it should be appreciated that any of the attendees 212, 216, 222, 224, 226, 232, 234, 236 could function as a presenter (or emitter) during a conference call. Alternatively, the attendee 214 may be sending a conference event, such as a chat message, to one or more of the other attendees. Although not shown in this example, the attendee 214 may also send conference information to one or a group of attendees rather than all of the attendees as shown in FIG. 2.

The conference information passes through the conferencing system in a push fashion using a peer-to-peer communication protocol. As shown by arrows in FIG. 2, the conference bridge 210 receives the conference information from the attendee 214 and passes the conference information to the attendees 212, 216 at the first site 202. The conference bridge 210 also passes the conference information to the conference bridge 220 at the second site 204 and to the conference bridge 230 at the third site 206. The conference bridge 220 passes the conference information to the attendees 222, 224, 226 at the second site 204, and the conference bridge 230 passes the conference information to the attendees 232, 234, 236 at the third site 206. The conference information may be passed between each of the devices using a network such as the Internet or using any other computer and/or communication network using known techniques.

Comparing the conferencing system shown in FIG. 1 with that shown in FIG. 2, it should be appreciated that overall bandwidth requirements can be reduced in a distributed conferencing system by sending conference data between each of the conference bridges, rather than between a conference bridge and each of the attendees at the different sites. In FIG. 1 there are six streams of conference information passing from the conference bridge 110 to the other attendees, while in FIG. 2 there are two streams of conference information passing from the conference bridge 210 to the other conference bridges 220, 230. This can be a significant benefit when the different sites 202, 204, 206 are located in physically distinct locations (e.g., the first site 202 may be located in the United States, the second site 204 may be located in Asia, and the third site 206 may be located in Europe). This can also reduce network traffic when the different sites 202, 204, 206 are merely topology-related groupings.

In an embodiment, the conference bridge 210 may provide conference information to attendees 212, 216 that includes audio with video and/or web data, while the conference information passed from the conference bridge 210 to conference bridges 220, 230 may include video and/or web data only. This can be used in systems where the conference information passed from the conference bridge 210 to conference bridges 220, 230 passes between networks that include a firewall or a similar security mechanism. In this manner, only video and/or web data is passed through the firewall so that fewer holes are punched through the firewall (smaller audio packets are not passed through the firewall). This can reduce a load on the firewall and improve overall performance. Such a configuration can be used, for example, with an earnings call where audio with video and/or web data may be provided internally (e.g., to company employees) while only video and/or web data are provided externally (e.g., to analysts). The audio portion of the conference information can be provided externally using a conventional phone path (e.g., using the PSTN, a VoIP service, a cellular service, or the like), rather than through the external conference bridge.

Continuing with the above example, in some embodiments the conference information is recorded only at the first conference bridge 210 or only at a portion of the conference bridges in the system. This can improve security of the conference information in situations where, for example, the conference bridge 210 is located inside an intranet while the conference bridges 220, 230 are located outside the intranet. In this example, the conference information may be recorded or stored only at the secure conference bridge 210.

In other embodiments, the conference information may be recorded at each of the conference bridges 210, 220, 230. This may increase system resources required to record and store the conference information, but allows the conference information to be available at each of the sites 202, 204, 206 without having to pass it between sites one or more additional times.

Other conferencing services, such as conference reporting, may also be provided at one or more of the conference bridges in accordance with embodiments of the present invention. In one embodiment, for example, each of the conference bridges may provide a status to the other conference bridges in the system. The status may be provided using one or more of the techniques described in commonly assigned U.S. patent application Ser. No. 12/414,238, filed Mar. 30, 2009, the contents of which are incorporated herein by reference in their entirety for all purposes. The status may include information such as the conference calls that the conference bridge is supporting and the attendees of each conference call. Using the status, the conference bridges may provide reporting information on a conference call such as attendees, time and date of conference call, length of conference call, and the like. The reporting information may be provided to a host of the conference call and/or may be stored at one or more of the conference bridges 210, 220, 230.

In some conferencing systems, communication ports on the conference bridges 210, 220, 230 may not all be configured to provide the same resources to the attendees (or to the communication devices used by the attendees). For example, some of the communication ports on the first conference bridge 210 may be configured to provide audio, video, and web resources, while other communication ports may be configured to provide only audio resources. Further, the communication ports on one conference bridge may be configured differently than the communication ports on another conference bridge in the system. For example, communication ports on the conference bridge 210 may be configured to provide audio, video, and web resources, while communication ports on the conference bridges 220, 230 may be configured to provide video and web resources only.

In one scenario, capacity for a conference call may be leased or purchased from a conference provider on an as-needed basis using embodiments described herein. For example, a company may have an internal conferencing system that includes one or more conference bridges configured to support normal conferencing activities. On occasion, however, the company may wish to host a conference call that requires additional resources, requires resources that are different than those provided by the internal conferencing system, and/or requires additional flexibility than what the internal conferencing system can provide. For example, the company may wish to provide audio, video, and/or web resources to attendees that are internal to a company intranet while providing only video and/or web resources to attendees that are external to the company intranet. The external attendees may be more than what the internal conferencing system can support or the internal conferencing system may not be configured to provide only video and/or web resources to external attendees. Embodiments described herein may be used to create a virtual distributed conferencing system where conference information is provided from a conference bridge that is part of the internal conferencing system to a conference bridge that is external to the internal conferencing system.

Figure 3A:
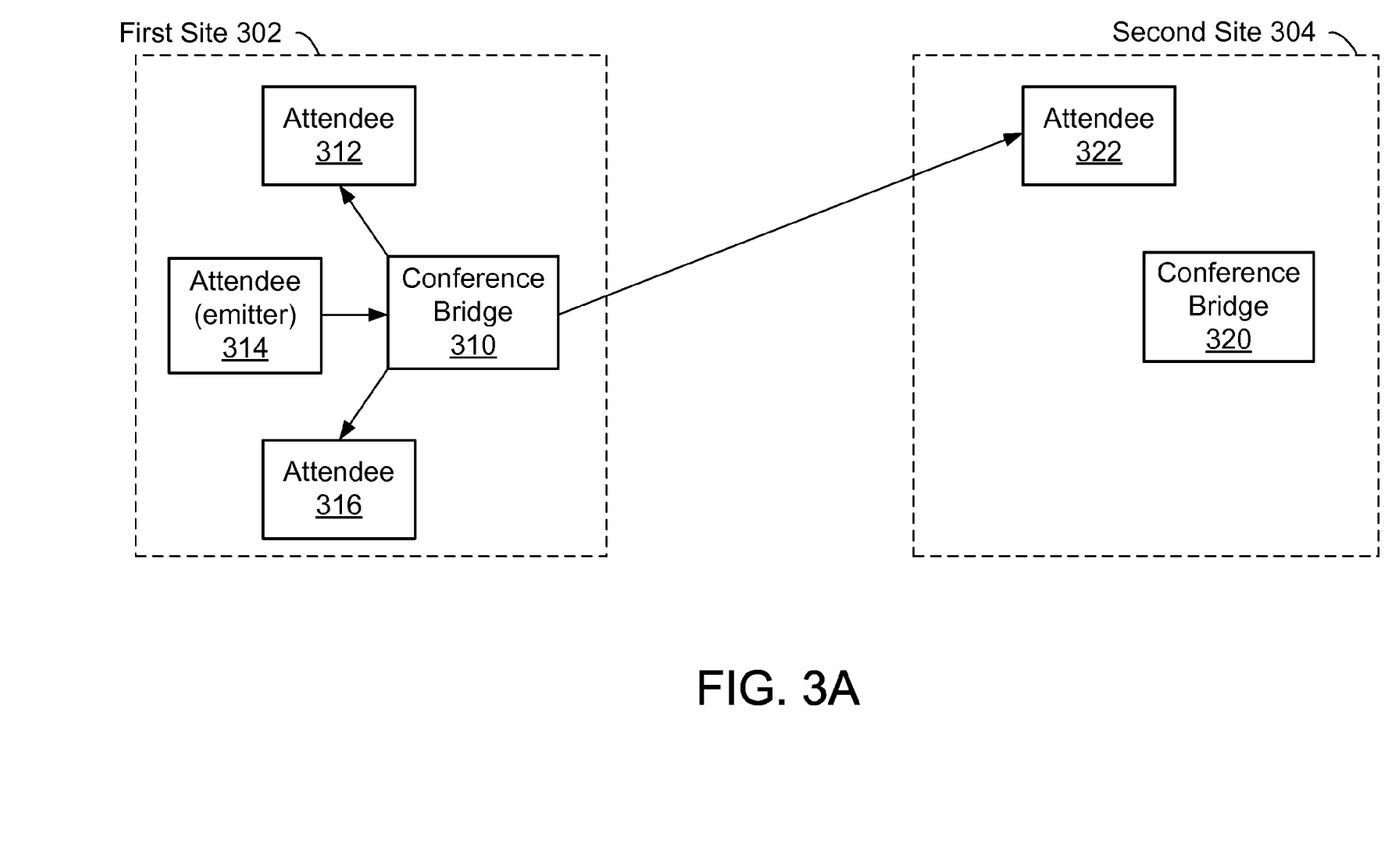
FIGS. 3A-3B are simplified diagrams of a distributed conferencing system in accordance with an embodiment of the invention.
Figure 3B:
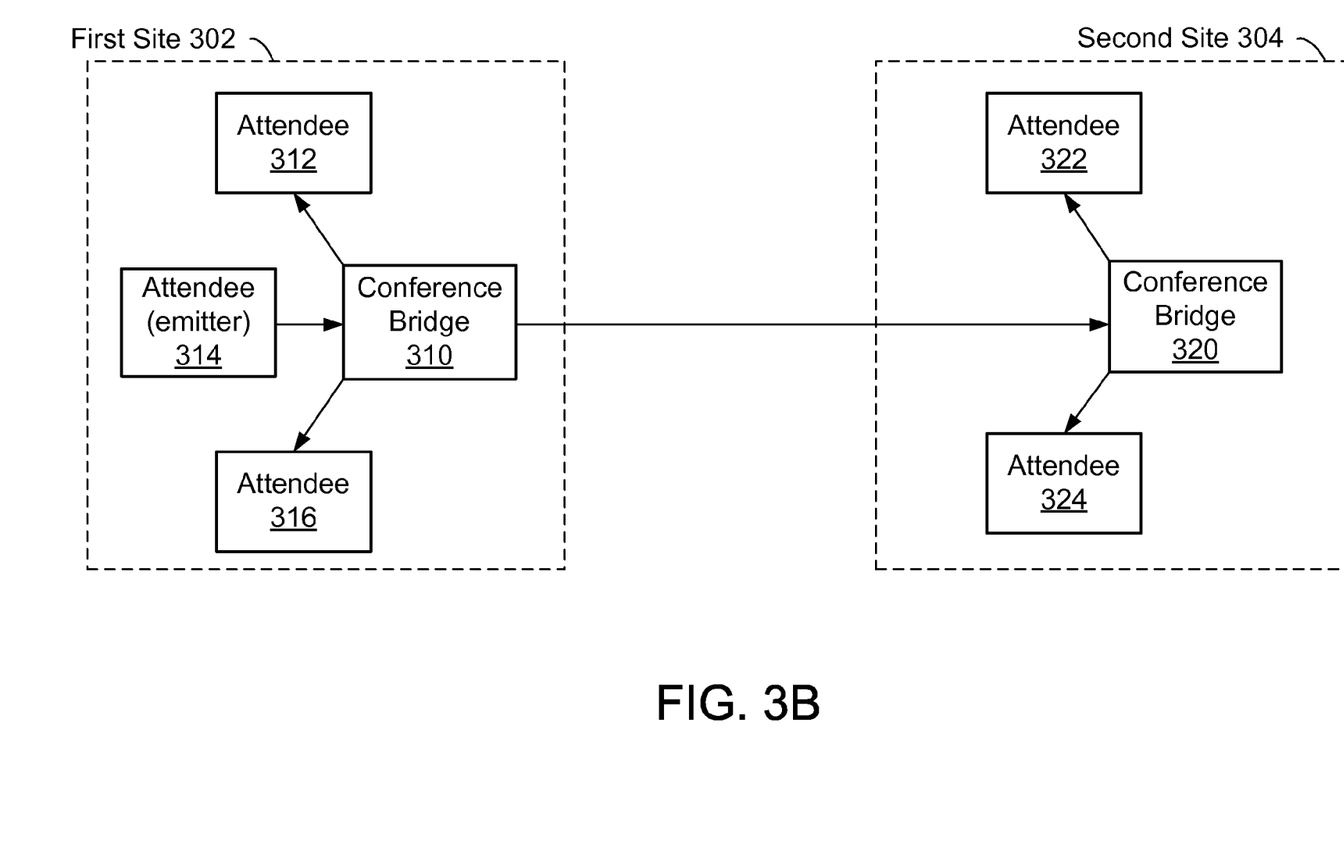

FIGS. 3A-3B are simplified diagrams of a distributed conferencing system in accordance with another embodiment of the invention. FIG. 3A provides a snapshot of conference information passing between conference bridges and attendees during a first time period of a conference call, and FIG. 3B provides a snapshot of conference information passing between conference bridges and attendees during a second time period of the conference call.

As indicated by an arrow in FIG. 3A, an attendee (or emitter) 314 provides conference information to a conference bridge 310 at a first site 302 during the first time period. The attendee 314 may be functioning as a presenter sending conference data or may be sending a conference event such as a chat message. The conference information passes through the conferencing system in a push fashion using a peer-to-peer communication protocol. As shown by arrows in FIG. 3A, the conference bridge 310 receives the conference information and passes the conference information to the attendees 312, 316 at the first site 302. The conference bridge 310 also passes the conference information to an attendee 322 at a second site 304. Because there is only one attendee at the second site 304, the conference bridge 310 passes the conference information directly to the attendee 322.

As indicated by an arrow in FIG. 3B, the attendee (or emitter) 314 also provides conference information to the conference bridge 310 during a second time period. As explained above, the attendee 314 may be functioning as a presenter sharing conference information or as an attendee sending a conference event. The conference information may be the same as or different than that provided by the attendee 314 in FIG. 3A. In FIG. 3B, a second attendee (attendee 324) is participating in the conference call at the second site 304. With two attendees at the second site 304, the conference bridge 310 passes the conference information to conference bridge 320 at the second site 304. The conference bridge 320 receives the conference information and passes it to attendees 322, 324. In this manner multiple conference bridges are utilized only when there are multiple attendees at more than one site.

While FIG. 2 shows three sites 202, 204, 206, and FIGS. 3A-3B show two sites 302, 304, it should be appreciated that the embodiments described herein may be implemented in systems having more or fewer sites. Embodiments may also be implemented within a single site having multiple conference bridges. Further, in some embodiments, the conference information may be passed between conference bridges in a star topology based on the attendee acting as an emitter of the conference information (as shown in FIG. 2), while in other embodiments, the conference information may be passed between at least some of the conference bridges in hopping fashion. For example, with regard to FIG. 2, in some embodiments the conference bridge 210 may pass the conference information received from the attendee 214 to attendees 212, 216 and to the conference bridge 220. The conference bridge 220 may pass the conference information to the attendees 222, 224, 226 and to the conference bridge 230, and the conference bridge 230 may pass the conference information to attendees 232, 234, 236. One of ordinary skill in the art would recognize many variations, modifications, and alternatives in light of the present disclosure.

In another embodiment, when an additional conference bridge begins supporting a conference call that is already in progress (such as the conference bridge 320 in FIG. 3B) and that requires video and/or web data, a current key frame of the conference information is provided to the conference bridge 320 before a previous key frame of the conference information is provided. A key frame is full image frame of video or web data (e.g., during screen sharing) that is typically interspersed between a number of partial image or I (interval) frames. The partial image frames typically only provide partial image updates to the video or web data. The conference information may be sent in individual packets or as a continuous stream in accordance with known techniques. Sending a current key frame first can bring the conference bridge 320 on-line more quickly than waiting for all of the previous conference information to be provided. Bringing the conference bridge 320 on-line more quickly allows the conference information to be provided to the attendees 322, 324 more quickly.

Figure 4:
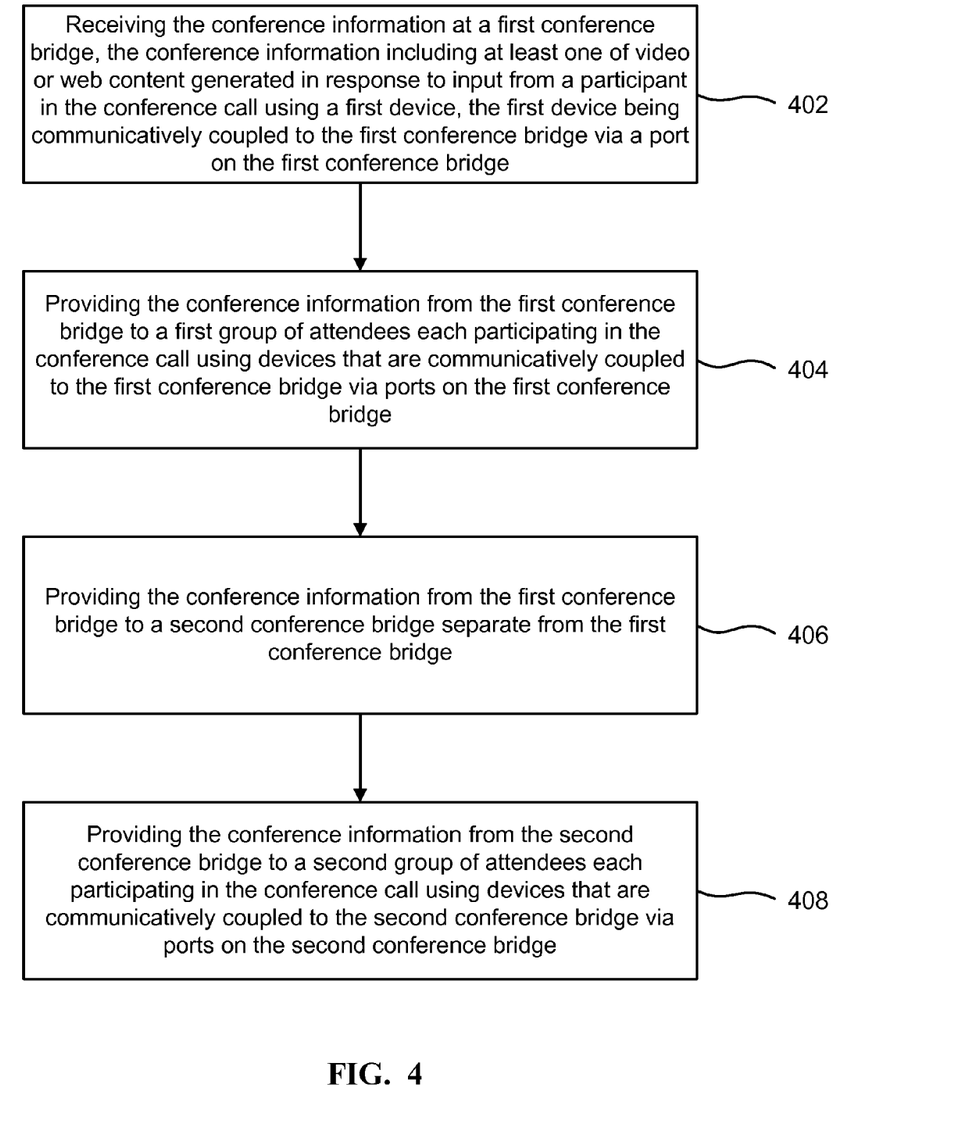
FIG. 4 is a flowchart illustrating an exemplary method for providing conference information to attendees of a conference call using a plurality of conference bridges in accordance with an embodiment of the invention.

FIG. 4 is a flowchart illustrating an exemplary method for providing conference information to attendees of a conference call using a plurality of conference bridges in accordance with an embodiment of the invention. The method includes receiving the conference information at a first conference bridge, the conference information including at least one of video or web data generated in response to input from a participant in the conference call using a first device, the first device being communicatively coupled to the first conference bridge via a port on the first conference bridge (402). The method also includes providing the conference information from the first conference bridge to a first group of attendees each participating in the conference call using devices that are communicatively coupled to the first conference bridge via ports on the first conference bridge (404). The method also includes providing the conference information from the first conference bridge to a second conference bridge separate from the first conference bridge (406). The method also includes providing the conference information from the second conference bridge to a second group of attendees each participating in the conference call using devices that are communicatively coupled to the second conference bridge via ports on the second conference bridge (408).

In an embodiment, the method also includes receiving an event at the second conference bridge, where the event is generated in response to input from an attendee of the second group of attendees, and providing the event from the second conference bridge to other attendees of the second group of attendees. Concurrently with providing the conference information from the first conference bridge to the second conference bridge, the method also includes providing the event from the second conference bridge to the first conference bridge. The method also includes providing the event from the first conference bridge to the first group of attendees.

Figure 5:
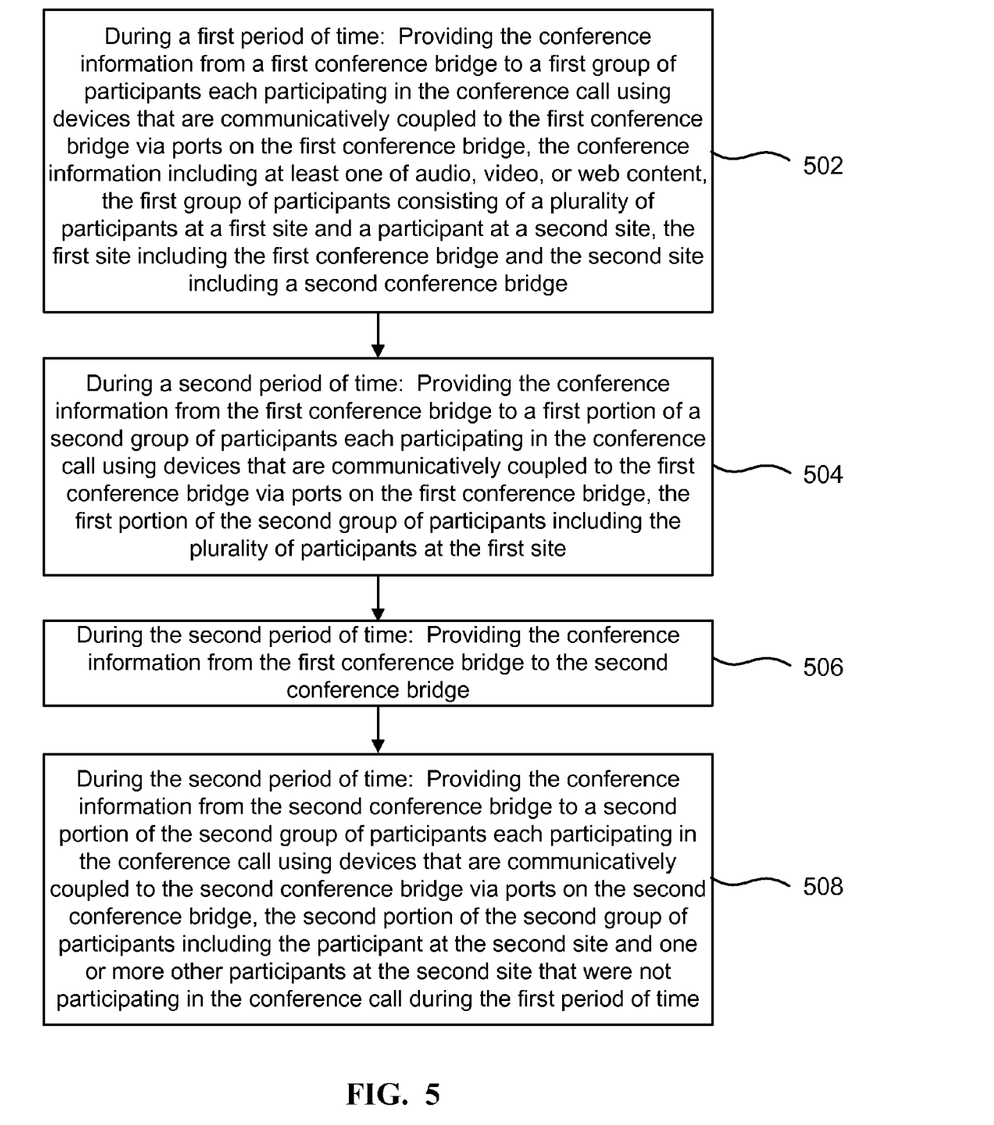
FIG. 5 is a flowchart illustrating an exemplary method for providing conference information to conference participants using a distributed conferencing system in accordance with an embodiment of the invention.

FIG. 5 is a flowchart illustrating an exemplary method for providing conference information to conference participants using a distributed conferencing system in accordance with an embodiment of the invention. The distributed conferencing system may include a plurality of conference bridges distributed across a plurality of sites, where each site includes at least one conference bridge that is part of a physical or logical grouping of communication devices.

During a first period of time, the method includes providing the conference information from a first conference bridge to a first group of participants each participating in a conference call using devices that are communicatively coupled to the first conference bridge via ports on the first conference bridge, the conference information including at least one of audio, video, or web data, the first group of participants consisting of a plurality of participants at a first site and a participant at a second site, the first site including the first conference bridge and the second site including a second conference bridge (502).

During a second time period, the method includes providing the conference information from the first conference bridge to a first portion of a second group of participants each participating in the conference call using devices that are communicatively coupled to the first conference bridge via ports on the first conference bridge, the first portion of the second group of participants including the plurality of participants at the first site (504). The method also includes, during the second time period, providing the conference information from the first conference bridge to the second conference bridge (506). The method also includes, during the second time period, providing the conference information from the second conference bridge to a second portion of the second group of participants each participating in the conference call using devices that are communicatively coupled to the second conference bridge via ports on the second conference bridge, the second portion of the second group of participants including the participant at the second site and one or more other participants at the second site that were not participating in the conference call during the first period of time (508).

It should be appreciated that the specific steps illustrated in FIGS. 4-5 provide particular methods for providing conference information according to some embodiments of the present invention. Other sequences of steps may also be performed according to alternative embodiments. For example, alternative embodiments of the present invention may perform the steps outlined above in a different order. Moreover, the individual steps illustrated in FIGS. 4-5 may include multiple sub-steps that may be performed in various sequences as appropriate to the individual step. Furthermore, additional steps may be added or removed depending on the particular application.

Figure 6:
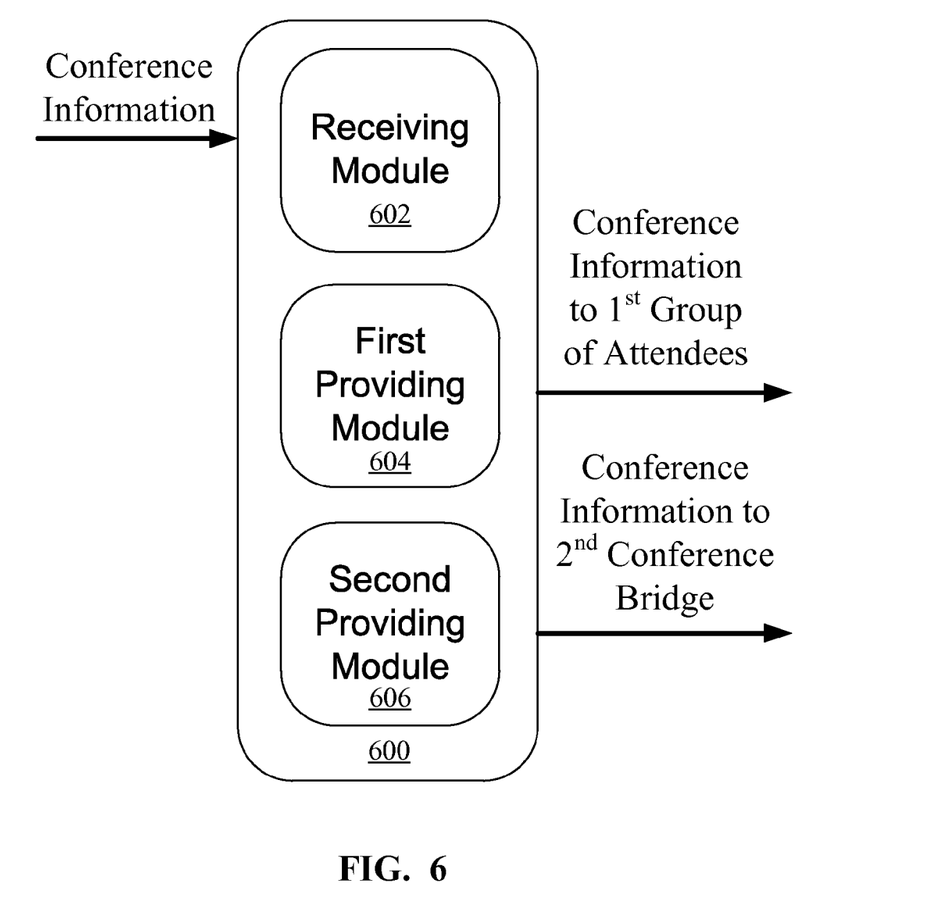
FIG. 6 is a simplified block diagram of a conference bridge in accordance with an embodiment of the invention.

FIG. 6 is a simplified block diagram of a conference bridge 600 in accordance with an embodiment of the invention. The conference bridge 600 is configured to implement embodiments of the present invention described above. The conference bridge 600 includes a receiving module 602. The receiving module 602 may be configured to receive conference information from an attendee of a conference call. The conference bridge 600 also includes a first providing module 604. The first providing module 604 may be configured to provide the conference information to a first group of attendees each participating in the conference call using devices that are communicatively coupled to the conference bridge 600 via ports on the conference bridge 600. The conference bridge 600 also includes a second providing module 606. The second providing module 606 may be configured to provide the conference information from the conference bridge 600 to a second conference bridge separate from the conference bridge 600.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. The scope of the present invention should be determined not with reference to the above description, but should be determined with reference to the appended claims along with their full scope of equivalents.

What is claimed is:

1. A method for providing conference information to attendees of a conference call near real time using a plurality of conference bridges, the method comprising:
receiving the conference information at a first conference bridge, the conference information including at least one of video or web data generated in response to input from a participant in the conference call using a first device, the first device being communicatively coupled to the first conference bridge via a port on the first conference bridge;
providing the conference information from the first conference bridge to a first group of attendees each participating in the conference call using devices that are communicatively coupled to the first conference bridge via ports on the first conference bridge, the conference information provided from the first conference bridge to the first group of attendees comprising audio data and video or web data;
providing the conference information from the first conference bridge to a second conference bridge separate from the first conference bridge; and
providing the conference information from the second conference bridge to a second group of attendees each participating in the conference call using devices that are communicatively coupled to the second conference bridge via ports on the second conference bridge, the conference information provided from the second conference bridge to the second group of attendees consisting of video or web data only, wherein the conference information provided from the first conference bridge to the first group of attendees is recorded at the first conference bridge, and the conference information provided from the second conference bridge to the second group of attendees is not recorded at the second conference bridge.

2. The method of claim 1 wherein the first conference bridge is part of a first site that comprises a physical or logical grouping of a first group of communication devices and the second conference bridge is part of a second site that comprises a physical or logical grouping of a different group of communication devices.

3. The method of claim 1 further comprising:
providing the conference information from the second conference bridge to a third conference bridge separate from the first and second conference bridges; and
providing the conference information from the third conference bridge to a third group of attendees each participating in the conference call using devices that are communicatively coupled to the third conference bridge via ports on the third conference bridge.

4. The method of claim 1 wherein the conference information is provided from the first conference bridge to the second conference bridge using a peer-to-peer network architecture.

5. A method for providing conference information to attendees of a conference call near real time using a plurality of conference bridges, the method comprising:
   receiving the conference information at a first conference bridge, the conference information including at least one of video or web data generated in response to input from a participant in the conference call using a first device, the first device being communicatively coupled to the first conference bridge via a port on the first conference bridge;
   providing the conference information from the first conference bridge to a first group of attendees each participating in the conference call using devices that are communicatively coupled to the first conference bridge via ports on the first conference bridge:
   providing the conference information from the first conference bridge to a second conference bridge separate from the first conference bridge; and
   providing the conference information from the second conference bridge to a second group of attendees each participating in the conference call using devices that are communicatively coupled to the second conference bridge via ports on the second conference bridge, wherein the conference information provided from the first conference bridge to the first group of attendees is recorded at the first conference bridge, and the conference information provided from the second conference bridge to the second group of attendees is not recorded at the second conference bridge, and wherein the conference information is provided from the first conference bridge to the first group of attendees before the conference information is provided from the second conference bridge to the second group of attendees, and a current key frame of the video or web data is provided from the first conference bridge to the second conference bridge before a previous key frame or previous partial image frames of the video or web data is provided from the first conference bridge to the second conference bridge.

6. The method of claim 1 wherein all of the ports on the first conference bridge are utilized to provide the conference information to the devices used by first group of attendees, and a portion of the ports on the second conference bridge are utilized to provide the conference information to the devices used by the second group of attendees.

7. The method of claim 1 wherein a portion of the ports on the first conference bridge are utilized to provide the conference information to the devices used by first group of attendees, and a portion of the ports on the second conference bridge are utilized to provide the conference information to the devices used by the second group of attendees.

8. A method for providing conference information to attendees of a conference call near real time using a plurality of conference bridges, the method comprising:
   receiving the conference information at a first conference bridge, the conference information including audio data and at least one of video or web data generated in response to input from a participant in the conference call using a first device, the first device being communicatively coupled to the first conference bridge via a port on the first conference bridge;
   providing the conference information from the first conference bridge to a first group of attendees each participating in the conference call using devices that are communicatively coupled to the first conference bridge via ports on the first conference bridge;
   providing the conference information from the first conference bridge to a second conference bridge separate from the first conference bridge; and
   providing the conference information from the second conference bridge to a second group of attendees each participating in the conference call using devices that are communicatively coupled to the second conference bridge via ports on the second conference bridge, wherein the conference information provided from the first conference bridge to the first group of attendees comprises the audio data and the at least one of video or web data, and the conference information provided from the second conference bridge to the second group of attendees comprises the at least one of video or web data and does not comprise the audio data.

9. The method of claim 8 wherein the first conference bridge is part of a first site that comprises a physical or logical grouping of a first group of communication devices and the second conference bridge is part of a second site that comprises a physical or logical grouping of a different group of communication devices.

10. The method of claim 8 wherein the conference information provided from the first conference bridge to the first group of attendees is recorded at the first conference bridge, and the conference information provided from the second conference bridge to the second group of attendees is not recorded at the second conference bridge.

11. The method of claim 8 further comprising:
   providing the conference information from the second conference bridge to a third conference bridge separate from the first and second conference bridges; and
   providing the conference information from the third conference bridge to a third group of attendees each participating in the conference call using devices that are communicatively coupled to the third conference bridge via ports on the third conference bridge.

12. The method of claim 8 wherein the conference information is provided from the first conference bridge to the first group of attendees before the conference information is provided from the second conference bridge to the second group of attendees, and a current key frame of the video or web data is provided from the first conference bridge to the second conference bridge before a previous key frame or previous partial image frames of the video or web data is provided from the first conference bridge to the second conference bridge.

13. The method of claim 8 wherein all of the ports on the first conference bridge are utilized to provide the conference information to the devices used by first group of attendees, and a portion of the ports on the second conference bridge are utilized to provide the conference information to the devices used by the second group of attendees.

14. The method of claim 8 wherein a portion of the ports on the first conference bridge are utilized to provide the conference information to the devices used by first group of attendees, and a portion of the ports on the second conference bridge are utilized to provide the conference information to the devices used by the second group of attendees.

15. A first conference bridge configured to provide conference information to attendees of a conference call near real time in a distributed conferencing system, comprising:
   a receiving module configured to receive the conference information, the conference information including audio data and at least one of video or web data;
   a first providing module configured to provide the conference information to a first group of attendees each participating in the conference call using devices that are communicatively coupled to the first conference bridge via ports on the first conference bridge; and a second providing module configured to provide the conference information from the first conference bridge to a second conference bridge separate from the first conference bridge, wherein the first providing module is configured to provide the audio data and the at least one of video or web data to the first group of attendees, and the second providing module is configured to provide the at least one of video or web data and not the audio data to the second conference bridge.

16. The conference bridge of claim 15 wherein the first and second providing modules are configured to provide the conference information using a peer-to-peer network architecture.

17. The conference bridge of claim 15 wherein the second providing module is configured to provide a current key frame of the video or web data to the second conference bridge before providing a previous key frame or previous partial image frames of the video or web data to the second conference bridge.

18. The conference bridge of claim 15 wherein the first providing module is configured to utilize all of the ports on the first conference bridge before the conference information is provided to the second conference bridge using the second providing module.

19. The conference bridge of claim 15 wherein the first providing module is configured to utilize a portion of the ports on the first conference bridge before the conference information is provided to the second conference bridge using the second providing module.

* * * * *